United States Patent [19]

Shimanaka et al.

[11] Patent Number: 5,088,045
[45] Date of Patent: Feb. 11, 1992

[54] PRODUCTION MANAGEMENT SYSTEM

[75] Inventors: Chikafumi Shimanaka; Shinzo Urushidani; Michio Fujinuma; Hiroshi Hamano; Shinji Imai, all of Sayama, Japan

[73] Assignee: Honda Giken Kogyo Kabushiki Kaisha, Tokyo, Japan

[21] Appl. No.: 460,027

[22] Filed: Jan. 2, 1990

[51] Int. Cl.⁵ .............................................. G06F 15/46
[52] U.S. Cl. ..................................... 364/468; 364/188; 364/469; 364/474.11
[58] Field of Search ............... 364/132, 138, 183, 188, 364/189, 468, 469, 478, 474.11, 474.16, 474.19

[56] References Cited

U.S. PATENT DOCUMENTS

| 4,309,600 | 1/1982 | Perry et al. | 364/468 |
|---|---|---|---|
| 4,472,783 | 9/1984 | Johnstone et al. | 364/132 |
| 4,535,401 | 8/1985 | Penn | 364/132 |
| 4,698,766 | 10/1987 | Entwistle et al. | 364/468 |
| 4,833,592 | 5/1989 | Yamanaka | 364/138 |
| 4,837,704 | 6/1989 | Lengefeld | 364/478 |
| 4,841,431 | 6/1989 | Takagi et al. | 364/187 |
| 4,931,944 | 6/1990 | Richter et al. | 364/468 |

FOREIGN PATENT DOCUMENTS 55-18349  2/1980 Japan .
61-236466 10/1986 Japan .

Primary Examiner—Jerry Smith
Assistant Examiner—Paul Gordon

[57] ABSTRACT

A production management system controls a production line having a plurality of assembling/machining stations including pieces of production equipment such as nut runners. The production management system includes a computer for supplying control information to control the pieces of production equipment, a first information network for transmitting the control information from the computer to the assembling/machining stations, and a second information network for transmitting information indicating results of operation in the assembling/machining stations to downstream assembling/machining stations to allow defective portions of workpieces to be repaired in the subsequent assembling-/machining stations. The first information network comprises a plurality of separate networks associated respectively with divided portions of the production line.

10 Claims, 9 Drawing Sheets

FIG.5

| SERIAL NUMBER | TEXT | | | | | | |
|---|---|---|---|---|---|---|---|
| A-1 | CARRIAGE NUMBER | | | | | | |
| A-2 | PRODUCT TYPE DATA | | | | | | |
| A-3 | ROBOT NUMBER | SHAFT NUMBER | TIGHTENING LOCATION | TIGHTENING TORQUE | TIGHTENING TIME | FRAME NUMBER | RESULT OF CHECK |
| A-3 | RBa1 | 212 | 202a | 5.0 | 2.0 | F-12 | OK |
|  |  |  | 202b | 3.0 | 1.0 | F-12 | NG |
| A-4 | RBa1 | 214 | 204a | 5.0 | 2.0 | F-12 | OK |
|  |  |  | 204b | 1.0 | 0.5 | F-12 | NG |
|  |  |  | 204c | 5.0 | 2.0 | F-12 | OK |
|  |  |  | 204d | 5.0 | 2.0 | F-12 | OK |
| A-5 | RBa1 | 216 | 206a | 5.0 | 2.0 | F-12 | OK |
|  |  |  | 206b | 5.0 | 2.0 | F-12 | OK |
|  |  |  | 206c | 2.0 | 0.7 | F-12 | NG |
|  |  |  | 206d | 5.0 | 2.0 | F-12 | OK |
| A-6 | RBa2 | — | 210a | 12.0 | 4.0 | F-12 | OK |
|  |  |  | 210b | 12.0 | 4.0 | F-12 | OK |
|  |  |  | 210c | 6.0 | 2.0 | F-12 | NG |
| A-7 | — | — | — | — | — | F-11 | OK |
| A-8 | — | — | — | — | — | F-10 | OK |
| A-9 | — | — | — | — | — | F-10 | OK |
| A-10 | — | — | — | — | — | F-10 | OK |

PRODUCTION MANAGEMENT SYSTEM

BACKGROUND OF THE INVENTION

The present invention relates to a production management system for use with an automatic production line for manufacturing automobiles or the like.

As more useful electronic devices are developed in recent years, production lines for manufacturing various products are being automatized to improve the quality of the manufactured products. Modern production lines include a plurality of assembling/machining stations combined with numerically controlled machine tools and automatic machines such as robots. These assembling/machining stations are coupled with an automatic warehouse or a material handling system including self-propelled carriages so that various workpieces such as parts to be machined and assembled can be automatically supplied to the assembling/machining stations. Such a combined system is known as an FA (Factory Automation) system, which includes a production management computer that controls the machining and assembling operation in each of the assembling/machining stations and controls or manages the flow or distribution of workpieces between the assembling/machining stations. The FA system is also employed to control automobile assembling/machining lines.

To meet diverse consumer needs, some automobile assembling/machining lines of today are each designed to assemble and machine automobiles of many different kinds based on desired combinations of types, grades, geographical regions of use, and options. It is therefore necessary to rely on a production management system for supervising information on automobiles assembled or machined on an automobile assembling/machining line, giving control information to the machine tools and automatic machines, and obtaining information with regard to how the production process is going on.

One known such production management system is disclosed in Japanese Laid-Open Patent Publication No. 61(1986)-236466. More specifically, the disclosed production management system includes a single network for transferring control information between individual pieces of production equipment and production management computers for controlling those pieces of production equipment, and data input/output devices or process control computers disposed in respective assembling/machining stations and connected to the single network.

Some production lines for manufacturing automobiles or the like are constructed such that information indicating a result of assembling or machining operation such as an assembling failure or the like at a certain assembling/machining station is transmitted to a subsequent assembling/machining station in which such an assembling failure will be removed. This system mainly serves the purpose of averaging the working times in the respective assembling/machining stations to shorten the track time of the production line.

If the control information for the pieces of production equipment in the assembling/machining stations and the result information are to be processed by the single network, the amount of information to be processed by the network is so vast that the time required to process such information is not negligible as compared with the track time of the production line. Moreover, since the period of time required to construct the network system is considerably long, the shipment of new products produced by the production line may be delayed. In addition, any failure or fault at one location in the network tends to bring about a shutdown of the entire production line.

The conventional production lines are designed with greater emphasis on the control of operation of the automatic machines, the control of the flow of workpieces, and the supervision of the number of assembled products. When a workpiece assembling/machining failure occurs in the automatic machine at a certain assembling/machining station, the workpiece cannot be fed from that assembling/machining station to a downstream assembling/machining station unless the workpiece assembling/machining failure is removed in the previous assembling/machining station. Under worst conditions, the workpieces cannot be fed from station to station along the production line.

The above drawback may be eliminated by a production management system in which means for determining the results of operation at the respective assembling/machining stations are associated with the drive shafts, respectively, of the automatic machines in the respective stations, and output signals from such determining means are sent to downstream assembling/machining stations attended by workers. Should any one of the automatic machines produce an assembling/machining failure, then the number of the drive shaft of that automatic machine is transmitted by way of the output signal of the determining means. The number is then displayed on display units in the downstream assembling/machining stations, or lamps located in the downstream assembling/machining stations and corresponding to the drive axis of the failing automatic machine are energized, thus letting the workers know the assembling/machining failure. The production management system of such a construction however consumes a long period of time before it can identify the location of the failure on the workpiece, and as a result the delivery of the workpieces along the production line needs to be stopped.

There is a demand for a system to be used in combination with the production line, described above, for effectively preventing a defective product from being manufactured. For example, Japanese Laid-Open Patent Publication No. 55(1980)-18349 discloses one such concept for preventing a defective product from being fabricated. The disclosed concept is directed to a method of determining whether a threaded component has been properly tightened or not by a nut runner. According to the disclosed method, the time required to tighten a bolt with the nut runner is measured, and it is determined whether the measured time is within a predetermined preset time or not. If the bolt is properly tightened, then "OK" is displayed on a display unit, and if the bolt is improperly tightened, then "NG" is displayed on the display unit. This method can reliably discover a bolt tightening failure, and hence can prevent a defective product with an improperly tightened bolt from being produced. When "NG" is displayed, such NG information is fed back to control the nut runner so that any subsequent operation of the nut runner is stopped. In this manner, no defective products will be manufactured.

According to the concept disclosed in Japanese Laid-Open Patent Publication No. 55(1980)-18349, however, a failure of an automatic machine such as a nut runner is detected only when a failure such as a bolt tightening failure is caused. Therefore, the production line must be shut off at the time the nut runner failure is detected. It is impossible to produce products within a predetermined track time.

SUMMARY OF THE INVENTION

It is a general object of the present invention to provide a production management system which is highly efficient.

Another object of the present invention is to provide a production management system for controlling a production line having a plurality of assembling/machining stations including pieces of production equipment, comprising a computer for supplying control information to control the pieces of production equipment, a first information network for transmitting the control information from the computer to the assembling/machining stations, and a second information network for transmitting information indicating results of operation in the assembling/machining stations to downstream assembling/machining stations to allow defective portions of workpieces to be repaired in the subsequent assembling/machining stations.

Still another object of the present invention is to provide the production management system wherein the first information network comprises a plurality of separate networks associated respectively with divided portions of the production line.

Yet another object of the present invention is to provide a production management system for controlling a production line having a plurality of assembling/machining stations including pieces of production equipment, comprising an information network for interconnecting the assembling/machining stations, display means in the assembling/machining stations, for displaying results of operation in the assembling/machining stations, detecting means associated with the pieces of production equipment, for detecting proper and improper operations on workpieces in the assembling/machining stations and transmitting data on the detected proper and improper operations from upstream assembling/machining stations to the display means in downstream assembling/machining stations through the information network, and control means for controlling the display means in the downstream assembling/machining stations to successively display the data on the detected proper and improper operations from the detecting means in the upstream assembling/machining stations in synchronism with arrival of the workpieces at the downstream assembling/machining stations.

Yet still another object of the present invention is to provide the production management system wherein the data to be displayed by the display means comprise configurations of the workpieces and data overlapping the configurations of the workpieces and indicative of locations with the proper and improper operations.

A further object of the present invention is to provide the production management system wherein the control means comprises means for controlling the display means to display the data successively from the upstream to downstream assembling/machining stations.

A still further object of the present invention is to provide a production management system for controlling a production line having a plurality of assembling/machining stations including pieces of production equipment, comprising an information network for interconnecting the assembling/machining stations, display means in the assembling/machining stations, for displaying results of operation in the assembling/machining stations, detecting means associated with the pieces of production equipment, for detecting proper and improper operations on workpieces in the assembling/machining stations and transmitting data on the detected proper and improper operations from upstream assembling/machining stations to the display means in downstream assembling/machining stations through the information network, entering means associated with the display means, respectively, for entering chronological data on repairs effected on workpieces based on the data displayed by the display means, and control means for controlling the display means in the downstream assembling/machining stations to successively display the data on the detected proper and improper operations from the detecting means in the upstream assembling/machining stations and the chronological data from the entering means in synchronism with arrival of the workpieces at the downstream assembling/machining stations.

A yet further object of the present invention is to provide the production management system wherein each of the entering means comprises touch screen mounted on a display surface of one of the display means.

Another object of the present invention is to provide a production management system for displaying results of operation effected by pieces of production equipment, comprising detecting means associated with the pieces of production equipment, for detecting results of operation on workpieces by the pieces of production equipment and transmitting data on proper operation when it is effected on the workpieces within a predetermined period of time and data on improper operation otherwise, and display means for displaying configurations of the workpieces and locations on the workpieces in different colors depending on the data on proper and improper operation on the workpieces.

Still another object of the present invention is to provide the production management system further including input means associated with the display means, respectively, for entering chronological data on the completion of repairs effected on workpieces based on the data displayed by the display means, the display means comprising means for displaying, in another different color, locations on the workpieces which have been subjected to the repairs in response to entering of the chronological data by the input means.

Yet another object of the present invention is to provide a production management system for controlling a production line having a piece of production equipment to operate on a workpiece based on operation pattern data, comprising detecting means associated with the piece of production equipment, for detecting data on a result of operation on the workpiece by the piece of production equipment, and control means for producing the operation pattern data, the control means comprising comparing monitor means for comparing a time-dependent change in the data from the detecting means with a predetermined value, and means responsive to an output signal from the comparing monitor means, for producing a signal indicative of an inspection or a repair to be made with respect to the piece of production equipment.

Yet still another object of the present invention is to provide the production management system wherein the piece of production equipment comprises a nut runner.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a table of data including data indicative of results of operation which are transmitted from data managers in the production line shown in FIGS. 1 and 2;

DETAILED DESCRIPTION OF THE PREFERRED EMBODIMENT

Figure 1:
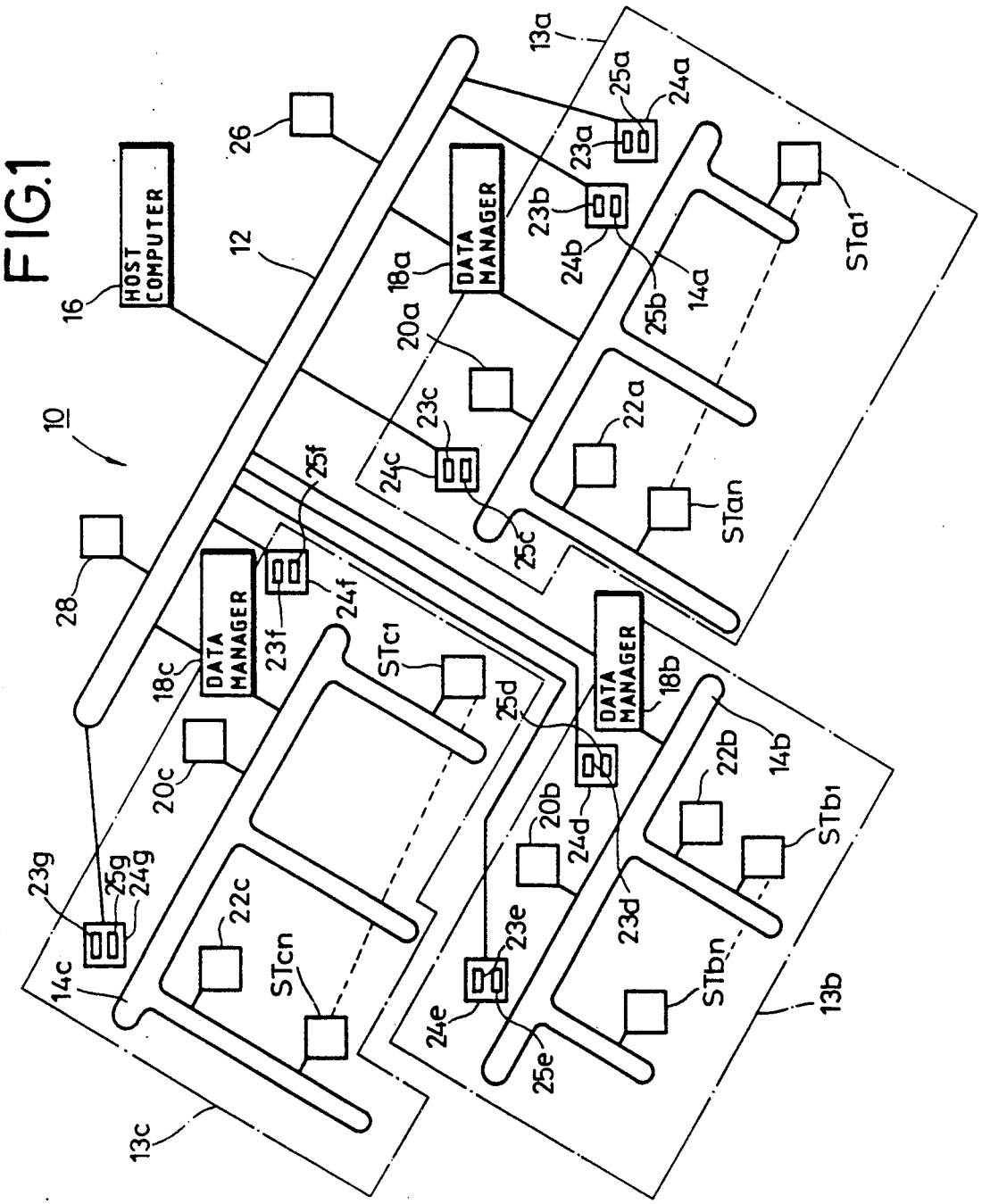
FIG. 1 is a schematic view of a production line in which a production management system according to the present invention is incorporated.

FIG. 1 schematically shows a production line incorporating a production management system according to the present invention. In the illustrated embodiment, the production line is shown as an automobile assembling-/machining line by way of example.

The production line, generally designated by the reference numeral 10, includes a main network 12 serving as an information network for transmitting data bearing information as to results of operation or the like, and subnetworks 14a through 14c associated respectively with a plurality of separate assembling/machining lines 13a through 13c, the subnetworks 14a through 14c serving as information networks for transmitting data bearing control information. The main network 12 and the subnetworks 14a through 14c are constructed of optical cables, for example.

To the main network 12, there is a connected a host computer 16 for controlling or managing the production on the production line 10. Subcomputers (hereinafter referred to as "data managers") 18a through 18c are connected between the main network 12 and the subnetworks 14a through 14c for transmitting and receiving data therebetween. The data managers 18a through 18c receive data, add predetermined serial numbers to all the received data, and transmit the data with the serial numbers, and have respective memories (not shown) for storing all the data with the serial numbers which are transmitted.

Self-propelled carriages run along the assembling-/machining lines 13a through 13c. The subnetworks 14a through 14c are associated with assembling/machining stations STa1 through STan, STb1 through STbn, and STc1 through STcn (hereinafter referred to as "assembling/machining stations STa1 through STcn"), respectively. The subnetworks 14a through 14c are also associated with respective control panels (hereinafter referred to as "overall control panels") 20a through 20c in the form of sequencers for supervising the positions and speeds of the self-propelled carriages and controlled actions to be carried out in the respective assembling-/machining stations STa1 through STcn under centralized control. To the subnetworks 14a through 14c, there are also connected respective sequences (hereinafter referred to as "block control panels") 22a through 22c for distributing control information to various pieces of production equipment comprising automatic machines such as robots or the like in the respective assembling-/machining stations STa1 through STcn depending on the travel of the self-propelled carriages, i.e., in synchronism with the introduction of workpieces.

Some assembling/machining stations STa1, STa4, etc. (see FIG. 2) of the assembling/machining stations STa1 through STcn on the production line 10 are assembling/machining stations in which workpieces are manually processed by workers M1, M2. Thus, the production line 10 in the illustrated embodiment includes manually operated assembling/machining stations. The second assembling/machining station STa2 is an assembling/machining station for installing a sun roof as a workpiece on an automobile body as a workpiece W. The third assembling/machining station STa3 is an assembling/machining station for mounting an instrument panel in an automobile body.

The assembling/machining lines 13a through 13c are combined with line side computers 24a through 24g arranged along the assembling/machining lines 13a through 13c and having respective display units 23a through 23g. The line side computers 24a through 24g are used as quality monitors for monitoring how workpieces are assembled in the assembling/machining stations STa1 through STcm, or product type checking motors, or monitors for supervising how data on results of operation of the automatic machines vary. The line side computers 24a through 24g are connected directly to the main network 12. The main network 12 is connected to supervising computers 26, 28 serving as supervising monitors for monitoring the degree to which the assembly lines 13a through 13c operate on duty and the total number of automobiles assembled.

Figure 2:
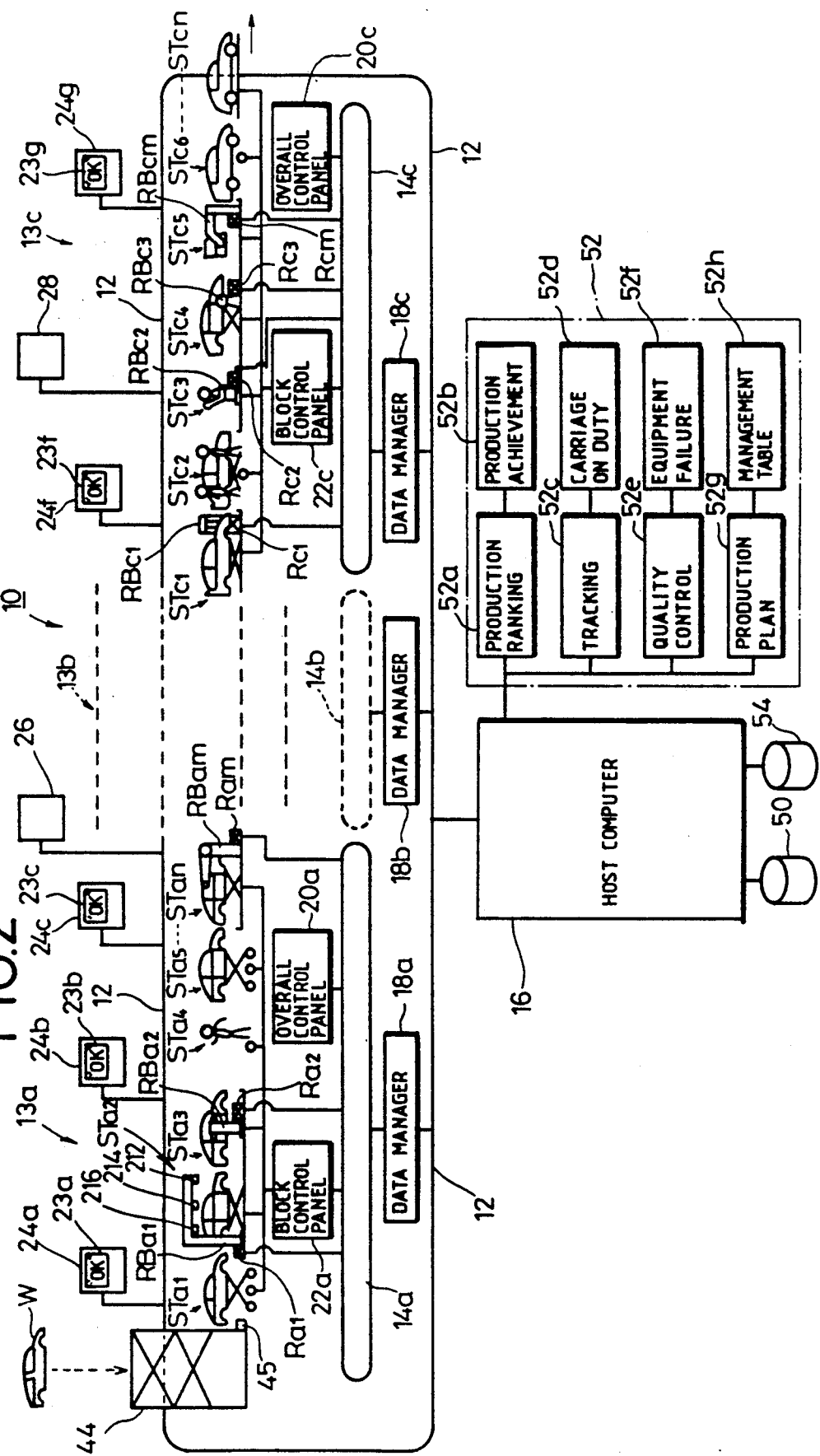
FIG. 2 is a detailed view of the production line shown in FIG. 1.

FIG. 2 shows in detail the production line 10 shown in FIG. 1. As illustrated in FIG. 2, the host computer 16 is associated with a product type data file 50 for storing product type data corresponding to workpieces W to be delivered onto the production line 10. The workpieces W (i.e., automobile bodies in the illustrated embodiment) have labels printed with bar codes indicative of product type number information of the workpieces W. When a workpiece W is delivered from a drop lifter 44 into the first machining station STa1 of the production line 10, the product type number information on the label is read by an input device (not shown) such as a bar code reader and applied therefrom to the host computer 16 through the main network 12. In response to the applied product type number information, the host computer 16 reads, from the data file 50, product type data corresponding to the product type number information, such as an engine identification number, a frame identification number, and certain assembling specifications. The host computer 16 then sends the product type data through the main network 12 to the line side computer 24a which stores the supplied product type data.

Figure 4:
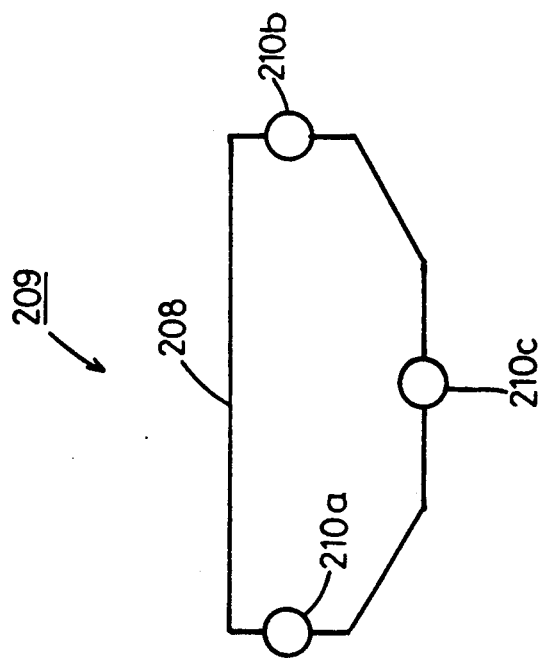
FIGS. 3 and 4 show diagrams indicating results of operation on workpieces assembled on the production line.
Figure 3:
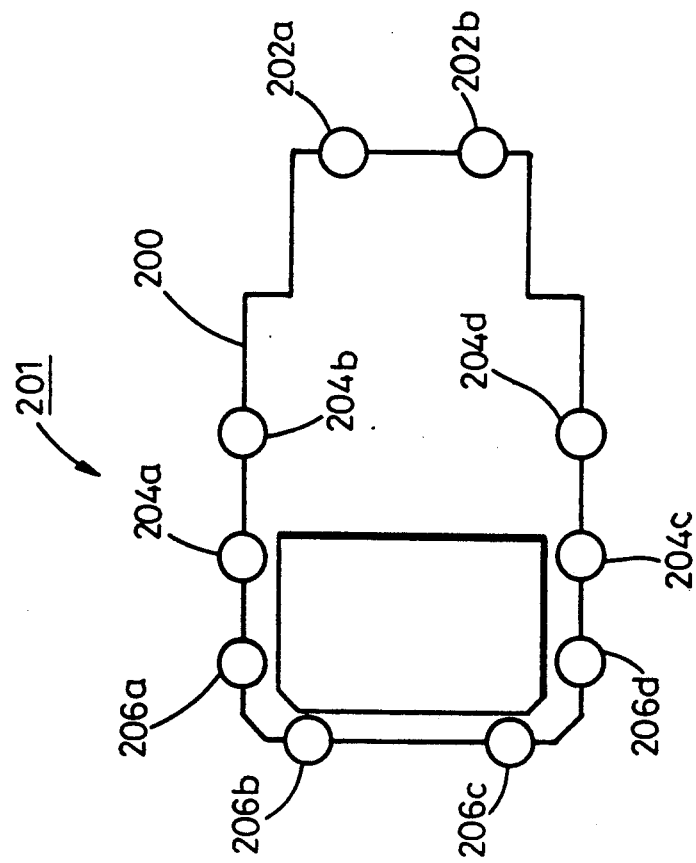

The host computer 16 is also associated with a quality monitor data file 54 for storing diagrams indicative of results of operation to be displayed on the display units 23a through 23g of the line side computers 24a through 24g. As shown in FIGS. 3 and 4, the diagrams indicative of results of operation include diagrams of parts or components such as a run roof, an instrument panel, a bumper, etc. as workpieces to be installed on an automobile body, and diagrams indicating whether the components have been properly fastened or not based on assembling specifications. The diagrams are stored as outer profile indication data and operating position indication data.

FIG. 3 shows a diagram 201 indicating results of operation of the second assembling/machining station STa2 which installs a sun roof 200, and FIG. 4 shows a diagram 209 indicating results of operation of the third assembling/machining station STa3 which installs an instrument panel 208. Smal circles in FIGS. 3 and 4 represent bolt tightening locations 202a, 202b, 204a through 204d, 206a through 206d, 210a through 210c. The bolt tightening locations 202a, 202b correspond to a nut runner mounted on a first shaft 212 (see FIG. 2) of a robot (automatic machine) RBa1 disposed in the first assembling/machining station STa2. The bolt tightening locations 204a through 204d and the bolt tightening locations 206a through 206d correspond to nut runners mounted on second and third shafts 214, 216 of the robot RBa1. The diagrams 201, 209 are processed so as to correspond to quality control data stored in a management table 52e of a production management table group 52 which comprises production management tables 52a through 52h. Thereafter, the diagrams 201, 209 are supplied through the main network 12 to the line side computers 24a through 24g which display the diagrams as quality monitor data on the display units 23a through 23g (which serve as means for displaying the results of operation).

The production management tables 52a through 52g store production ranking data, production achievement data, tracking data, self-propelled carriage on-duty data, quality control data, equipment failure data, and production plan data, respectively. The production management table 52h stores common information indicative of the arrangements of the assembling/machining lines corresponding to the subnetworks 14a through 14c, the arrangements of the pieces of production equipment such as automatic machines installed in the assembling/machining stations STa1 through STcn, operation pattern information of the pieces of production equipment, and the types of actuators used. The tracking data referred to above are data for controlling the self-propelled carriages based on the self-propelled carriage on-duty data so that they will smoothly run on the assembling/machining lines 13a through 13c without a collision. The tracking data are delivered to the overall control panels 20a through 20c.

The common information stored in the production management table 52h is supplied from the host computer 16 through the main network 12, the data managers 18a through 18c, and the subnetworks 14a through 14c to the overall control panels 20a through 20c and the block control panels 22a through 22c in which the common information is stored, and also through the main network 12 to the line side computers 24a through 24g and the supervising computers 26, 28 in which the common information is stored. The supplied common information is also stored in the data managers 18a through 18c.

When the common information is to be modified, i.e., changed or removed due to a change in the arrangement of the assembling/machining lines resulting from different type grades, geographical regions, and options of automobiles assembled on the production line 10, or due to modification or removal of the pieces of assembling equipment and their operation pattern information, or due to a change in the types of the actuators used, only the common information stored in the management table 52h associated with the host computer 16 is changed, added, or deleted, and the corrected common information is then supplied through the main network 12, the data managers 18a through 18c, and the subnetworks 14a through 14c to the control panes 20a through 20c, 22a through 22c, and the computers 26, 28. Accordingly, the common information can be modified with ease.

To the line side computers 24a through 24g, there are connected comparing monitors 25a through 25g for analyzing the quality control data including data on results of operation, which are stored in the management table 52e, to estimate the degree of fatigue of the automatic machines in the assembling/machining lines 13a through 13c.

In the illustrated embodiment, automobile bodies are assembled and machined on the assembling/machining line 13a corresponding to the subnetwork 14a, suspensions are assembled and machined on the assembling/machining line 13b corresponding to the subnetwork 14b, and engines are assembled on the assembling/machining line 13c corresponding to the subnetwork 14c by robots RBc1 through RBcm, robot controllers Rc1 through Rcm, and workers. However, the assembing/machining lines 13a through 13c may be employed to assemble and machine automobile parts in different combinations.

The production line incorporating the production management system of the invention is basically constructed a described above. Operation and advantages of the production line and the production management system will be described below.

The production management system is started to establish track times in view of the number of automobiles to be produced, a standard operation time, a rest time, etc., and the production line 10 is operated for the track times. Since assembling/machining stations requiring manual operation, such as the fourth assembling/machining station STa4, need repair times in addition to the time in which to effect their own operation, their track times include such a repair times.

After the above preparatory process, a workpiece W supplied from the drop lifter 44 is placed on a self-propelled carriage which is then moved to carry the workpiece W to the first machining station STa1. Upon arrival of the workpiece W at the first machining station STa1, the identification data indicating the carriage number are read by an input means (not shown) from the self-propelled carriage which carries the workpiece W, and sent to the overall control panel 20a which stores the received identification data.

The text composed of the identification data indicative of the carriage number is transmitted as data 100 (see FIG. 5) from the overall control panel 20a through the subnetwork 14a, the data manager 18a, and the main network 12 to the line side computer 24a. At this time, as shown in FIG. 5, a serial number A-1 is added to the text by the data manager 18a before the data 100 are transmitted to the line side computer 24a. The transmitted data 100 with the serial number A-1 added are also stored in the memory of the data manager 18a.

Upon reception of the transmitted data 100 with the serial number A-1 added thereto, the line side computer 24a checks the received data 100 up with carriage identification data which have previously been transmitted from the host computer 16 and stored in the line side computer 24a. If the data 100 agree with the stored carriage identification data, then the line side computer 24a transmits an agreement signal to the host computer 16. In response to the agreement signal, the host computer 16 supplies the product type data corresponding to the workpiece W carried on the carriage having the above carriage number through the main network 12 and the data manager 18a to the overall control panel 20a and the block control panel 18a. The product type data include a frame number (body number) for identifying the workpiece W, i.e., the automobile. The data manager 18a adds a serial number A-2 to the product type data, transmits the product type data with the serial number A-2 as data 100, and stores the data 100 in its memory (see FIG. 5). In the first assembling/machining station STa1, the worker M1 compares the carriage number of the self-propelled carriage and the frame number of the workpiece W carried on that self-propelled carriage for confirmation.

The overall control panel 20a has as many storage areas a1 through cn as the number of the assembling-/machining stations STa1 through STcn. The storage area a1 of the overall control panel 20a stores the carriage number and the product type data as a data pair. This data pair is transferred successively through the storage area a2, the storage area a3, and so in synchronism with the movement of the self-propelled carriage. The product type data transmitted to the block control panel 22a are supplied to the robot controllers Ra1 through Ram associated with the respective robots RBa1 through RBam in the assembling/machining stations STa1 through STan.

The robot controllers Ra1 through Ram select an operation pattern program corresponding to the product type and prepared according to the product type data from the block control panel 22a, and control the robots RBa1 through RBam, respectively, to perform works assigned to the respective machining stations STa1 through Stan. Then, the block control panel 22a sends data on results of operation within the track time from the robot controllers Ra1 through Ram through the data manager 18a of the subnetwork 14 and the main network 12 to the host computer 16. The text of the data 102 on results of operation includes, as shown in FIG. 5, the robot number of the robot RBa1 having the first through third shafts 212, 214, 216 associated with the nut runners (means for detecting results of operation) each having a torque sensor comprising a strain gage, a timer, and means for determining whether the job is performed properly or not, the shaft numbers of first through third shafts 212, 214, 216 of the robot RBa1, bolt tightening locations on the sun roof 200 and the instrument panel 208, the tightening torque value, the tightening time, the frame number given to the workpiece W, and data indicative of whether the nut is tightened properly ("OK") or improperly ("NG"). The data "NG" means that the predetermined tightening torque is not reached within the predetermined tightening time. In the data 102 shown in FIG. 5, the tightening locations 202b, 204b, 206c on the sun roof 200 and the tightening location 210c on the instrument panel 208 are subjected to operation failures, i.e., tightening failures. Such an operation failure may occur when chips remain in a threaded hole in the workpiece W. To the data 102, there are added serial numbers A-3 through A-10 by the data manager 18a before they are sent as data 100 to the host computer 16.

The host computer (control means) 16 determines whether the serial numbers A-3 through A-10 in the transmitted data 100 are consecutive or not. If any serial number lacks, then the host computer 16 requests the data manager 18a to transmit the data 100 to the lacking serial number, so that the host computer 16 can obtain the complete data 100 relative to the lacking serial number which are stored in the data manager 18a. The data 100 relative to the serial numbers A-3 through A-10 are quality control data as data on results of operation, which are recorded in the management table 52e in the table group 52 (FIG. 2) and also transmitted to the quality monitor data file 54. At this time, the host computer 16 processes the data in the diagrams 201, 209 stored in the data file 54 such that the data relative of the tightening locations 202b, 204b, 206c, 210c will be displayed in red and the data relative to the other tightening locations 202a, 204a will be displayed in blue.

When the block control panel 22a receives operation completion signals indicating the completion of operation in the assembling/machining stations STa1 through STan from the robot controllers Ra1 through Ram, these signals are sent to the overall control panel 20a. The overall control panel 20a controls all carriages running on the assembling/machining line 13a corresponding to the subnetwork 14a, and also carriages moving between the assembling/machining stations STa1 through STan at all times. The overall control panel 20a transmits movement permit signals to self-propelled carriages through the block control panel 22a.

The self-propelled carriage then runs toward a downstream assembling/machining station. Since tightening failures have been taken place in the second and third assembling/machining stations STa2, STa3, the diagrams 201, 209 are successively displayed on the display unit 23b of the line side computer 24b disposed on the side of the fourth assembling/machining station STa4.

Figure 6:
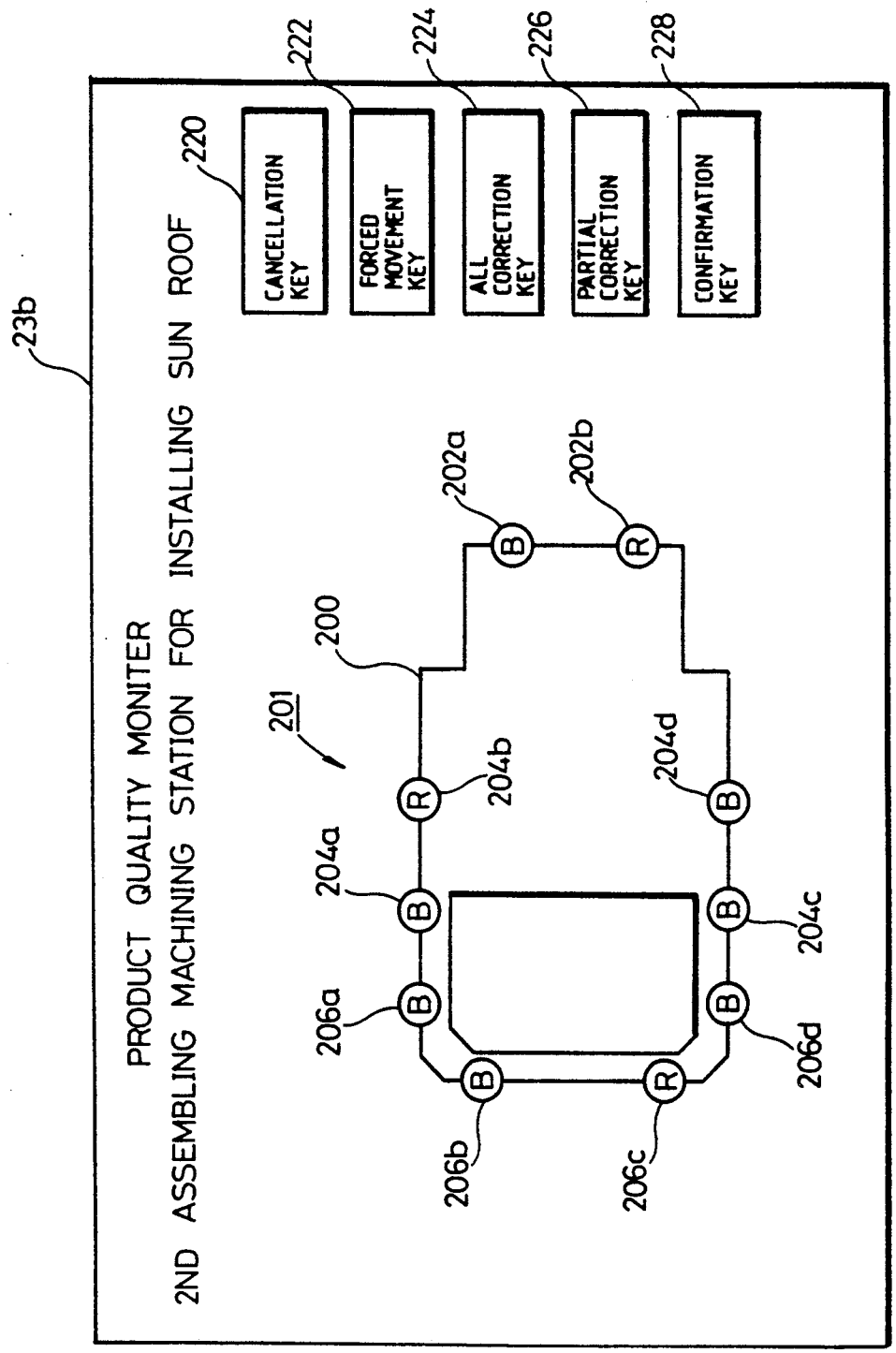
FIGS. 6 and 7 are diagrams showing results of operation displayed on a display unit in the production line.
Figure 7:
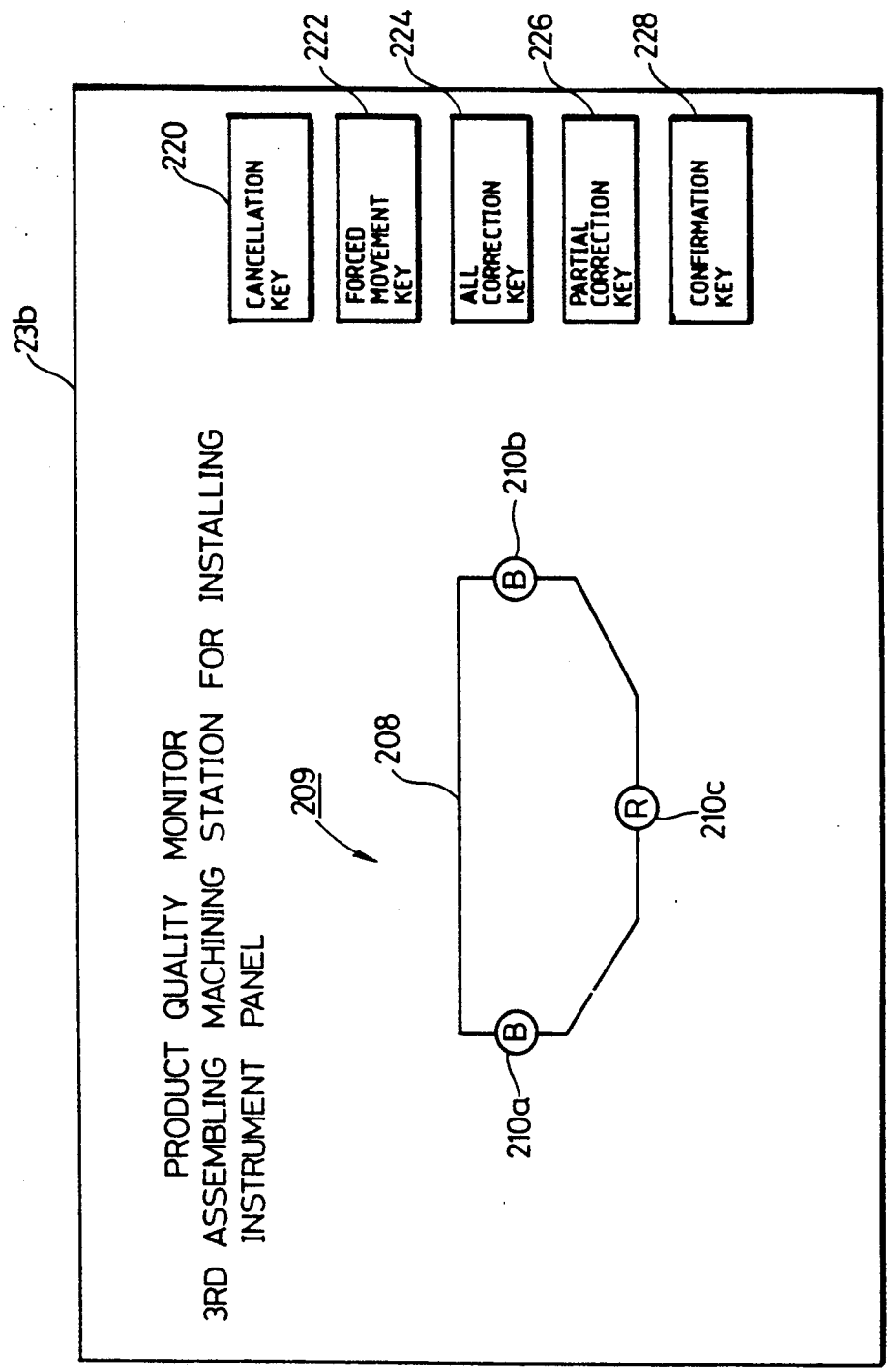

The diagrams 201, 209 displayed on the display unit 23b are shown by way of example in FIGS. 6 and 7. The displays shown in FIGS. 6 and 7 are referred to as quality monitor displays. FIG. 6 shows the display unit 23b which displays the diagram 201 indicating operation failures that have occurred in the second assembling/machining station STa2. The letters R, B in the small circles at the tightening locations 202a, 202b, 204a through 204d, and 206a through 206d indicate that the small circles are displayed in red and blue, respectively. In FIG. 6, the tightening locations 202b, 204b, 206c which are subjected to the operation failures, i.e., bolts are tightened improperly, are displayed in red (R), and the other tightening locations where bolts are tightened properly are displayed in blue (B).

The worker M2 then effects a corrective action in the tightening locations 202b, 204b, 206c for example by removing chips from the corresponding threaded holes in the workpiece W and tightening the bolts with a manual nut runner (not shown).

Figure 8:
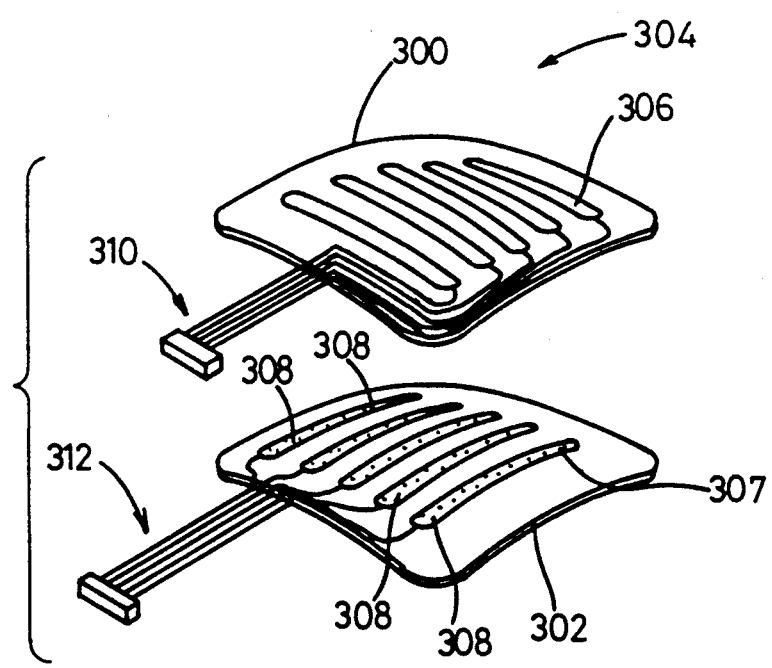
FIG. 8 is a perspective view of a touch screen mounted on the display unit.

Each of the display units 23a through 23g has a transparent touch screen (means for entering chronological data on corrective actions) 304 (FIG. 8) attached to the front face of a display tube, the touch screen 304 having a movable electrode film 300 and a fixed electrode film 302. To the electrode films 300, 302, there are attached transparent electrodes 306, transparent electrodes 307, dot spacers 308, and lead cables 310, 312. The lead cables 310, 312 are connected to the line side computers 24a through 24g. By lightly pushing the movable electrode 300 with a finger, one of the transparent electrodes 306 and one of the transparent electrodes 307, which cross each other at the position where the movable electrode 300 is pushed, are brought into electric contact with each other, thereby determining an address on the X-Y matrix of each of the display units 23a through 23g.

Figure 9:
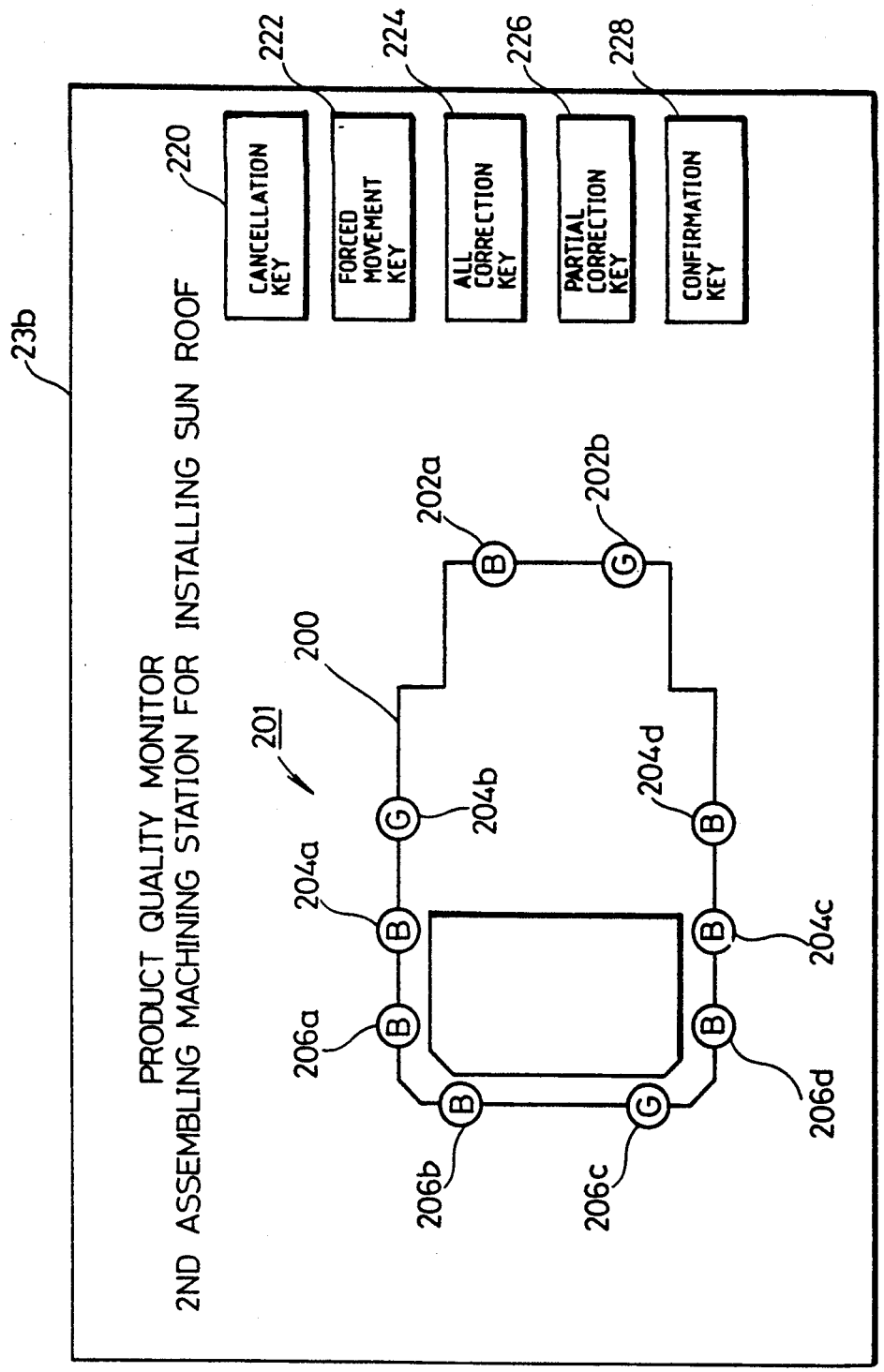
FIG. 9 is a diagram showing data displayed on the display unit after a repair has been made based on the displayed results of operation shown in FIG. 6.

The worker M2 now enter data with regard to locations where a corrective action or repair is made. The repaired location data can be entered simply by the worker M2 who lightly touches the touch screen 304, i.e., the front face of the display unit 23b, at a desired position. As shown in FIGS. 6 and 7, the display unit 23b has five touch keys on its front face. When all the tightening failure locations 202b, 204b, 206c have been repaired, the worker M2 pushes an all correction key 224, and then pushes a confirmation key 228. Each time these keys are depressed, their color is changed, and the small circles at the tightening locations 202b, 204b, 206c turn green (G), thereby indicating that the bolts are properly tightened in these locations 202b, 204b, 206c (see FIG. 9).

If repairs are completed within the track time at the tightening locations 202b, 204b but not completed within the track time at the tightening location 206c, thus leaving the tightening location 206c as a tightening failure location, then the small circles at the tightening locations 202b, 204b are pushed by a finger, and a partial correction key 226 and a confirmation key 228 are successively pushed by a finger in the order named. The small circles at the tightening locations 202b, 204b turn green (G), but the small circle at the tightening location 206c remains red (R). A repair may be made at the tightening location 206c, for example, in the next assembling/machining station which involves manual work, with the quality monitor being utilized.

If tools for repairing or correcting the tightening failure locations 202b, 204b, 206c are not available in the fourth assembling/machining station STa4, then a forced movement key 222 and the confirmation key 228 are successively pushed by a finger in that order to cause the self-propelled carriage carrying the workpiece W to the downstream fifth assembling/machining station STa5.

A cancellation key 220 is used to cancel information that is entered when a tightening location which has already been repaired is erroneously touched. Therefore, when the cancellation key 220 is pushed, an image displayed after the wrong information has been entered is replaced with the former image.

After the repairs regarding the tightening of the sun roof 200 have been finished, the display unit 23b displays information as to tightening failures with the instrument panel 208 installed in the third assembling/machining station STa3, i.e., the diagram 209 (FIG. 7). The worker M2 can repair or correct those tightening failures in the same manner as those with the sun roof 200.

The above operation is repeated to move the self-propelled carriages and distribute the product type data to the assembling/machining stations STa1 through STan. The robots RB1a through RBam disposed in the respective assembling/machining stations STa1 through STan effect given operations according to the product type data, and repairs are effected while utilizing the quality monitors, thus maintaining a desired quality of assembling and machining operation.

The assembling/machining lines 13b, 13c corresponding to the respective subnetworks 14b, 14c are of the same construction as that of the assembling/machining line 13a of the subnetwork 14a. The functions of the overall control panels 20b, 20c and the block control panels 22b, 22c are also the same as those of the overall control panel 20a and the block control panel 22a. The data managers 18b, 18c are structurally and functionally identical to the data manager 18a. More specifically, the data managers 18b, 18c add serial numbers to the data to be transmitted and received, and store the data with the serial numbers in their respective memories. The serial numbers to be added by the data managers 18b, 18c are different from those to be added by the data manager 18a, e.g., they are B-1, B-2, ... and C-1, C2, ..., respectively, so that the networks from which these data have been transmitted can be identified.

Any defective products are prevented from being shipped at the final assembling/machining station STcn where the data "OK" or "NG" are checked with respect to all the tightening locations by the line side computer 24g.

With the above embodiment, when certain operation failures on a workpiece are not repaired or corrected at an assembling/machining station having an automatic machine (piece of production equipment) and the workpiece is fed from that assembling/machining station to a downstream assembling/machining station, the configuration of the workpiece and locations with such operation failures and locations with no operation failures on the workpiece are displayed as a graphic image on a display unit in the downstream assembling/machining station, the display unit having a touch screen. The locations with no operation failures, i.e., no tightening failures, are displayed in blue, where the locations with operation failures, i.e., tightening failures, are displayed in red. Therefore, the workers at the downstream assembling/machining locations can quickly identify the operation failure locations, and make repairs speedily at those operation failure locations.

The locations with operation failures may be displayed by blinking lights, rather than by the different color display.

If information indicative of the repair or correction at a operation failure location is entered through a touch screen by the worker, then the operation failure location is displayed in green (G) and also it becomes possible to obtain chronological data on results of operation. More specifically, chronological data with respect to locations displayed in green, i.e., locations in which repairs have been made, enables the worker to improve or modify a certain automatic machine or robot which tends to cause more failures.

A particular repair or corrective action to be taken when an operation failure has occurred in an assembling/machining station will be described below. For example, a corrective action to be effected when a nut tightening failure has taken place in the assembling/machining station will be described below.

An operation completion signal is transmitted to the overall control panel 20a from the robot controller Ra2 at the assembling/machining station STa3. The overall control panel 20a supplies the operation completion signal through the data manager 18a to the line side computer 24b. When the self-propelled carriage moves from the assembling/machining station STa3 to carry the workpiece W to the next assembling/machining station STa4, the line side computer 24b displays the results of operation on the monitor display unit 24b of the line side computer 23b. If there is a tightening failure, then the component which is subjected to the tightening failure and the location subjected to the tightening failure on the workpiece W are displayed on the display unit 23b. If the results of operation, i.e., tightening operation, are acceptable within a certain allowable range, then "OK" is displayed. When a tightening failure or failures take place, all the tightening failures at the displayed locations are repaired or corrected. The self-propelled carriage does not move to a next station unless the worker M2 enters information indicative of the completion of the correction into the line side computer 24b. When such information indicative of the completion of the correction is entered into the line side computer 24b by the worker M2 after the correction at the fourth assembling/ machining station STa4, the line side computer 24b supplies the contents of the correction and the identification number of the workpiece W to the overall control panel 20a through the data manager 18a. The overall control panel 20a then produces a signal for allowing the self-propelled carriage to start moving. The data indicating the contents of the correction are fed through the main network 12 to the host computer 16 in which they are stored as the quality control data in the production management table 52e of the table group 52e.

If it is impossible to repair or correct the failures at all the operation failure locations within the track time and hence the failures which remain unrepaired or uncorrected are to be corrected in the next assembling/machining station, then it is necessary to deliver the workpiece W with those uncorrected failures to the next station. In this case, the self-propelled carriage can be started in the same procedure as described above. More specifically, the worker M2 enters information indicating that there are corrected and uncorrected failure locations on the workpiece W into the line side computer 24b. In response to such information, the line side computer 24b transmits the product type number of the workpiece W with the uncorrected failure locations to the host computer 16 and also transmits information indicating that the self-propelled carriage is to be forcibly started to the data manager 18a.

The host computer 16 stores the data indicating the contents of the correction and the uncorrected failure locations and the data on the product type number, as the quality control data, in the production management table 52e. The data manager 18a then transmits a movement permit signal to allow the self-propelled carriage to start moving to the overall control panel 20a. Based on the movement permit signal, the overall control panel 20a applies a start signal to the self-propelled carriage, which is then moved toward the next station.

All the quality control data, described above, with respect to the particular workpiece W are collected. When the workpiece W leaves the final assembling/machining station STcn, the corrected quality control data can be printed by a printer (not shown) connected to the host computer 16 and stored in an external memory device (not shown).

The on-duty data with respect to the pieces of production equipment in the assembling/machining stations STa1 through STan of the production line 10 are collected by the supervising computers 26, 28, which monitor the on-duty conditions of the pieces of production equipment, malfunctions thereof, and the number of products being produced in a day. More specifically, the data indicative of the conditions of the pieces of production equipment in the assembling/machining stations STa1 through STan are supplied to the block control panels 22a through 22c and the overall control panels 20a through 20c. The data managers 18a through 18c periodically read these condition data from the overall control panels 20a through 20c. If some condition data are changed due to a command for changing equipment or malfunctioning data are produced from malfunction monitor units associated with the pieces of production equipment, the data managers 18a through 18c transmit such condition data or malfunctioning data to corresponding ones of the line side computers 24a through 24g and the supervising computers 26, 28. The line side computers 24a through 24g then display malfunctioning conditions on the display units 23a through 23g. The supervising computers 26, 28 store equipment on-duty data and malfunctioning data such as the contents of the malfunctions, the names of the pieces of production equipment which are suffering from the malfunctions, the times at which the malfunctions have occurred, and the times required to recover the malfunctioning pieces of production equipment.

As described above, the information indicating the results of operation at the assembling/machining stations 13a through 13c are delivered from the subnetworks 14a through 14c through the data managers 18a through 18c and the main network 12 to the corresponding line side computers 24a through 24g. The information indicating the results of operation is also transmitted between the line side computers 24a through 24g through the main network 12. The assembling/machining stations STa1 through STcn are divided into a plurality of blocks, i.e., the assembling/machining lines 13c through 13c, and the subnetworks 14a through 14c are associated respectively with the assembling/machining lines 13c through 13c. Therefore, control information for controlling the pieces of production equipment in the assembling/machining stations of the assembling/machining lines can be independently transmitted within the subnetworks 14a through 14c through the main control panels 20a through 20c and the block control panels 22a through 22c.

Figure 10:
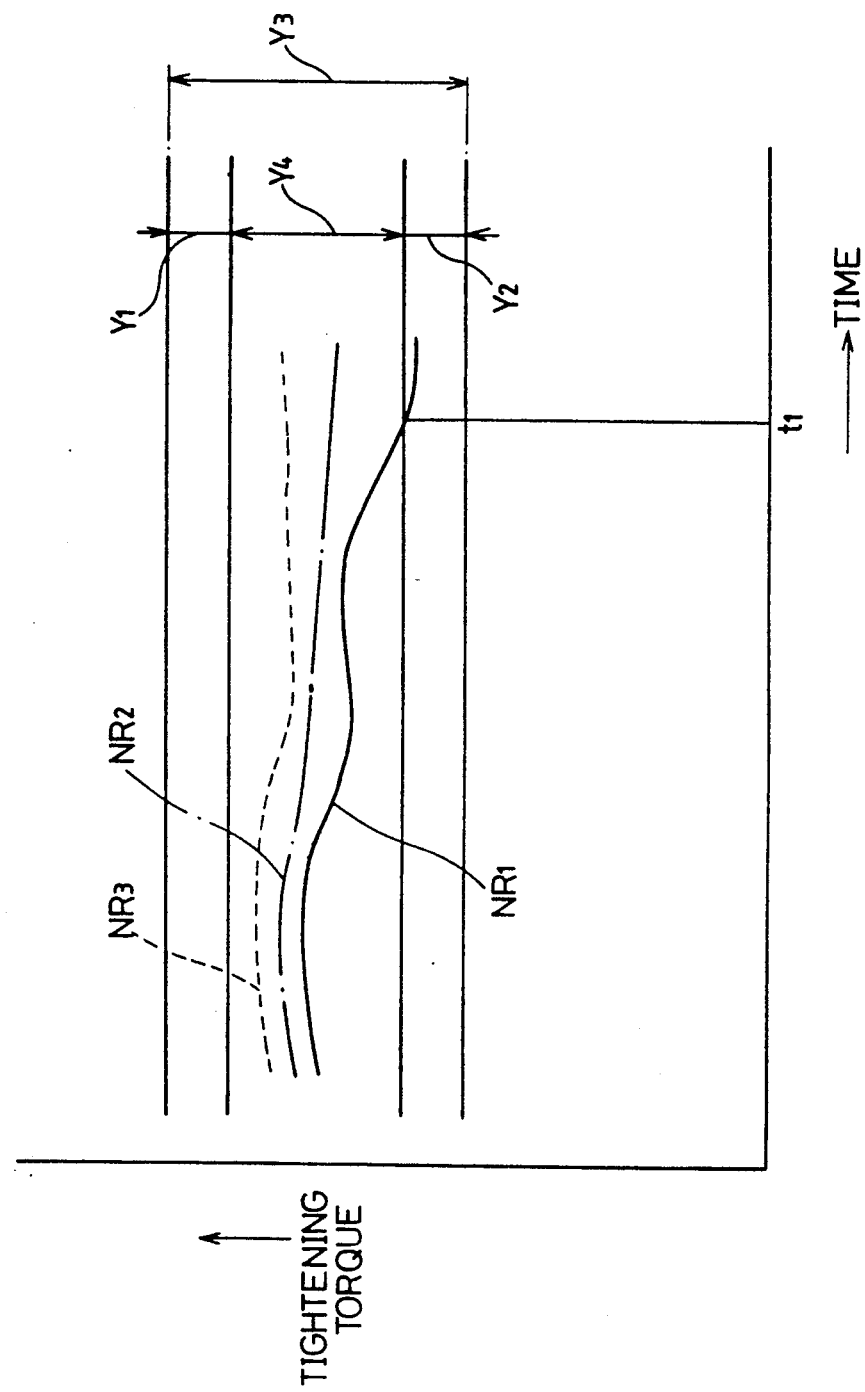
FIG. 10 is a diagram illustrative of the analysis of data on results of operation in the production management system of the present invention.

As described above, the data ranging from the serial number A-3 to the serial number A-10 of the transmitted data 100 shown in FIG. 5 are indicative of the results of operation, and stored in the management table 52e. The comparing monitors 25a through 25g of the line side computers 24a through 24g effect the following comparison by way of an interrupt process. First, the comparing monitors 25a through 25g prepare time-dependent torque changing characteristics NR1 through NR3 (see FIG. 10) of the data on the results of operation which represent the actual values of the tightening torques produced by the robot RBa1. The graph of FIG. 10 includes a horizontal axis representing time and a vertical axis representing the tightening torque. The time-dependent torque changing characteristics NR1 through NR3 correspond respectively to the tightening torques generated by the torque runners mounted on the first through third shafts 212, 214, 216 of the robot RBa1.

Allowable upper and lower limit torque ranges Y1, Y2 and an allowable torque range Y3 for the tightening torques are also plotted in the same graph. These allowable torque ranges Y1, Y2, Y3 have been determined by a tightening torque test in which the workpieces are not delivered from station to station for production within the track time, and have been stored in memories of the comparing monitors 25a through 25g.

The coordinate data representing the allowable torque ranges Y1 through Y3 and the time-dependent torque changing characteristics NR1 through NR3 are displayed, as required, on the display units 23a through 23g of the line side computers 24a, through 24g. A worker, e.g., the worker M2 (see FIG. 2) at the fourth assembling/machining station, controls the display 23b of the line side computer 24b to display the time-dependent torque changing characteristics indicative of the data on the results of operation shown in FIG. 4, and knows from the displayed contents that the tightening torque produced by the nut runner mounted on the first shaft 212 of the robot RB1 falls in the allowable lower limit torque range Y2 at a time t1.

It has already been recognized that the tightening torque falls in the allowable lower limit torque range Y2 because of wear on gears of the nut runner on the first shaft 212, or deformation due to fatigue of a socket of the nut runner, or characteristic deterioration due to fatigue of a drive motor of the nut runner. After the end of the production process in the day, the worker M2 inspects the nut runner on the first shaft 212, replaces a component or components which are greatly fatigued or damaged, and then confirms that the tightening torque now falls in an optimum allowable range Y4 within the allowable range Y3. When the production process is started in the next day, malfunctions or failures which would otherwise be caused by the robot RB1 can thus be prevented from happening.

In the above embodiment, malfunctions or failures of the nut runner are prevented form occurring through the analysis of the time-dependent torque changing characteristics. However, fatigue or damage of the nut runners maya be analyzed more accurately through an additional analysis of time-dependent changing characteristics of the tightening times.

The worker is required to observe the displayed data to detect when the data on results of operation fall outside the optimum allowable range in the illustrated embodiment. However, when the data on results of operation fall outside the optimum allowable range, a lamp may be turned on and off to let the worker know that fact.

The data on results of operation of the nut runner are analyzed in the above embodiment. However, time-dependent changes in the times during which to energize welding robots of the production line and also in the currents which are supplied to the welding robots may be analyzed to detect malfunctions.

With the present invention, as described above, the production management system includes an information network for transmitting control information to control and supervise pieces of production equipment at assembling/machining stations and an information network, independent of the above information network, for transmitting information as to results of information at the assembling/machining stations. It is therefore possible to transmit the control information and the information on the results of operation at high speed. Since the times required to transmit the control information and the information on the results of operation between the networks are so short that they are almost negligible as compared with the track time of the production line, the production efficiency of the production line is increased. The information network for transmitting the control information is divided into networks associated with divided production lines. In the event of trouble in one of the assembling/machining stations, only the production line belonging to the network which includes the troubled assembling/machining station may be shut off for maintenance and repairs, and the entire production line system is not required to be shut off. With the divided networks, the networks can be separately tested at the time the production management system is constructed. Thus, the preparatory period of time before the production management system is readied for full operation is shortened, with the result that the period of development from a design stage to shipment of products is also reduced.

Moreover, data regarding results of operation indicating proper and improper operations of the automatic machines at the assembling/machining stations along the production line, and chronological data regarding repairs or corrections at locations where improper operations have been effected are successively recorded and transmitted to downstream assembling/machining stations through the information network. If a certain repair on a workpiece is not completed within the track time at an assembling/machining station, then the workpiece with the unrepaired location is fed to a downstream assembling/machining station in which it can be repaired. As a consequence, the production line is highly reliable since it is prevented from being shut off while workpieces are successively delivered from station to station for assembling and machining operation within the track time.

In the final assembling/machining station, the data on results of operation are confirmed again to prevent shipment of any defective products, and various conditions such as tightening torques can be controlled so as to be uniform. As a result, the production line can produce products of high quality.

Furthermore, data regarding results of operation indicating proper and improper operations of the automatic machines at the assembling/machining stations along the production line are successively recorded and transmitted to downstream assembling/machining station through the information network. Those data and data on the configurations of workpieces are then displayed on the display units at the downstream assembling/machining stations. Locations on a workpieces where proper and improper operations are effected are displayed in different colors. If a certain repair on a workpiece is not completed within the track time at an assembling/machining station, then the workpiece with the unrepaired location is fed to a downstream assembling/machining station in which it can quickly be identified and repaired. As a consequence, the production line is highly reliable since it is prevented from being shut off while workpieces are successively delivered from station to station for assembling and machining operation within the track time.

Since those locations of a workpiece which have been repaired are displayed in a different color, chronological conditions of operation on the workpiece can be recognized at a glance. Based on the display of those chronological conditions of operation, any automatic machines can be inspected or repaired in advance so that those automatic machines are prevented from malfunctioning.

The data on results of operation of automatic machines (pieces of production equipment) at the assembling/machining stations along the production line are successively recorded. Therefore, the degree to which the automatic machines are fatigued can be known and the times at which they will fail to operation can be expected based on the analysis of time-dependent changes in the recorded data on results of operation. Before those automatic machines malfunction, they can be repaired so that the production line is kept highly reliable without shutdown due to any malfunctioning of the automatic machines during the production process.

Although a certain preferred embodiment has been shown and described, it should be understood that many changes and modifications may be made therein without departing from the scope of the appended claims.

What is claimed is:

1. A production management system for controlling a production line having a plurality of assembling/machining stations including pieces of production equipment, comprising:

a computer for supply control information to control the pieces of production equipment;

a first information network for transmitting the control information from said computer to the assembling/machining stations, wherein said first information network comprises a plurality of separate networks associated respectively with divided portions of said production line, each of said separate networks including a plurality of assembling/machining stations; and a second information network for transmitting information indicating results of a completed operation in the assembling/machining stations to downstream assembling/machining stations to allow defective portions of workpieces to be repaired in the subsequent assembling/machining stations.

2. A production management system for controlling a production line having a plurality of assembling/machining stations including pieces of production equipment, comprising:

an information network for interconnecting the assembling/machining stations;

display means in the assembling/machining stations, for displaying results of a completed operation in the assembling/machining stations;

detecting means associated with the pieces of production equipment, for detecting proper and improper completed operations on workpieces in the assembling/machining stations and transmitting data on the detected proper and improper completed operations from upstream assembling/machining stations to the display means in downstream assembling/machining stations through said information network; and control means for controlling said display means in the downstream assembling/machining stations to successively display the data on the detected proper and improper completed operations from the detecting means in the upstream assembling/machining stations in synchronism with arrival of the workpieces at the downstream assembling/machining stations.

3. The production management system according to claim 2, wherein the data to be displayed by said display means comprise configurations of the workpieces and data overlapping the configurations of the workpieces and indicative of locations with the proper and improper completed operations.

4. The production management system according to claim 2, wherein said control means comprises means for controlling said display means to display the data successively from the upstream to downstream assembling/machining stations.

5. A production management system for controlling a production line having a plurality of assembling/machining stations including pieces of production equipment, comprising:

an information network for interconnecting the assembling/machining stations;

display means in the assembling/machining stations, for displaying results of a completed operation in the assembling/machining stations;

detecting means associated with the pieces of production equipment, for detecting proper and improper completed operations on workpieces in the assembling/machining stations and transmitting data on the detected proper and improper completed operations from upstream assembling/machining stations to the display means in downstream assembling/machining stations through said information network;

entering means associated with said display means, respectively, for entering chronological data on repairs effected on workpieces based on the data displayed by said display means; and control means for controlling said display means in the downstream assembling/machining stations to successively display the data on the detected proper and improper completed operations from the detecting means in the upstream assembling/machining stations and the chronological data from said entering means in synchronism with arrival of the workpieces at the downstream assembling/machining stations.

6. The production management system according to claim 5, wherein each of said entering means comprises a touch screen mounted on a display surface of one of said display means.

7. A production management system for displaying results of a completed operation effected by pieces of production equipment, comprising:

detecting means associated with the pieces of production equipment, for detecting results of a completed operation on workpieces by the pieces of production equipment and transmitting data on proper completed operation when it is effected on the workpieces within a predetermined period of time and data on improper completed operation otherwise; and display means for displaying configurations of the workpieces and locations on the workpieces in different colors depending on the data on proper and improper completed operations on the workpieces.

8. The production management system according to claim 7, and further including input means associated with said display means, respectively, for entering chronological data on the completion of repairs effected on workpieces based on the data displayed by said display means, said display means comprising means for displaying, in another different color, locations on the workpieces which have been subjected to the repairs in response to entering of the chronological data by said input means.

9. A production management system for controlling a production line having a piece of production equipment to operate on a workpiece based on operation pattern data, comprising:

detecting means associated with the piece of production equipment, for detecting data on a result of a completed operation on the workpiece by the piece of production equipment; and control means for producing the operation pattern data, said control means comprising comparing monitor means for comparing a time-dependent change in the data from said detecting means with a predetermined value, and means responsive to an output signal from said comparing monitor means, for producing a signal indicative of an inspection or a repair to be made with respect to the piece of production equipment.

10. A production management system according to claim 9, wherein said piece of production equipment comprises a nut runner.

* * * * *